March 18, 1924.

A. O. HUBBARD

WHEEL

Filed Nov. 4, 1921

1,486,895

Inventor
ARTHUR O. HUBBARD

By Paul & Paul
HIS ATTORNEYS

Patented Mar. 18, 1924.

1,486,895

UNITED STATES PATENT OFFICE.

ARTHUR O. HUBBARD, OF MINNEAPOLIS, MINNESOTA.

WHEEL.

Application filed November 4, 1921. Serial No. 512,819.

*To all whom it may concern:*

Be it known that I, ARTHUR O. HUBBARD, a citizen of the United States, resident of Minneapolis, county of Hennepin, State of Minnesota, have invented certain new and useful Improvements in Wheels, of which the following is a specification.

The object of my invention is to provide a wheel adapted particularly for a child's wagon or barrows, and one that will be rigid in construction and inexpensive to manufacture.

The invention consists generally in various constructions and combinations, all as hereinafter described and particularly pointed out in the claims.

In the accompanying drawings forming part of this specification,

Figure 1:
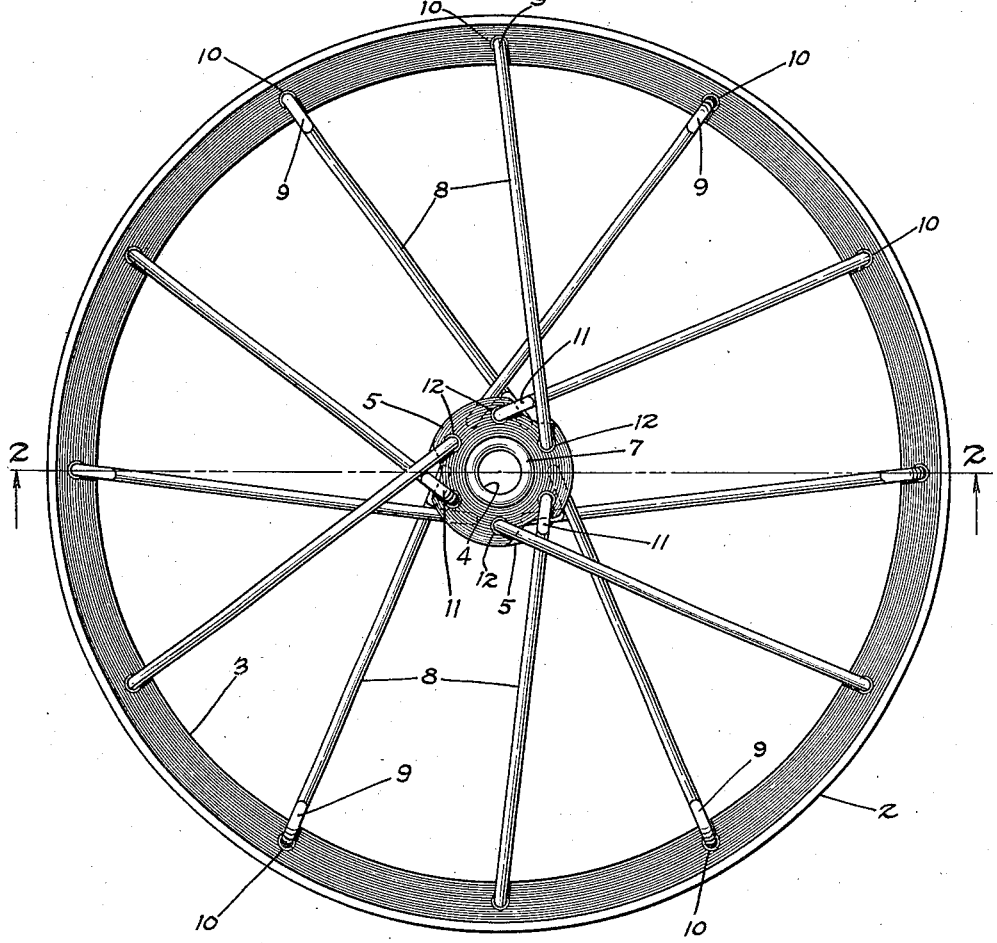
Figure 1 is a side elevation of a wheel embodying my invention.
Figure 2:
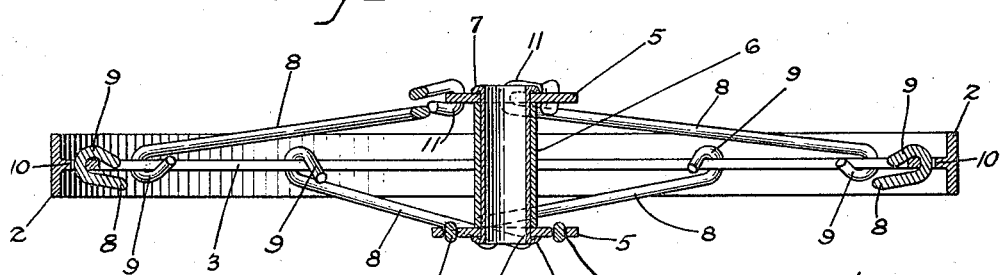
Figure 2 is a sectional view on the line 2—2 of Figure 1.

In the drawing, 2 represents the rim of the wheel, made preferably of T-bar bent to a circular form to provide an internal centrally arranged annular flange 3. 4 represents a hub, 5 a disc through which the ends of the hub are inserted and 6 a spacing sleeve encircling the hub and against which the discs 5 are seated. The ends 7 of the hub are rolled outwardly upon the discs, thereby locking them and the hub and spacing sleeve firmly together. 8 represents the spokes of the wheel, having outer ends 9 bent for insertion into holes 10 in the flange 3, the inner ends of the spokes having positively turned ends 11 which are inserted through holes 12 in the discs. These spokes are preferably arranged as shown in Figure 1, with the inner ends of adjacent spokes in crossed relation at the same end of the hub, and with the bends turned in opposite directions; that is, one inner end being inserted through the disc on one side and the corresponding end of the other spoke being inserted through the hole in the disc from the opposite side. Thus these spokes will have a longitudinal tension substantially at right angles to one another and will aid materially in strengthening and bracing the wheel.

When the ends of the spokes are inserted in their respective sockets and folded or bent to secure them therein, the spokes will be put under tension and the ends of the hub will be held rigidly, centrally with respect to the axis of the rim.

In assembling the wheel, the inner ends of the spokes are first inserted into the holes in the hub flanges and clinched therein by a suitable means. Then the outer ends of the spokes are inserted through holes in the rim flange and a drawing tool is applied to said outer ends by means of which they are clinched to the wheel rim and the spokes are put under sufficient tension to hold the hub and rim rigidly and provide a very strong, durable wheel.

I claim as my invention:

1. A wheel comprising a rim having a flange thereon, and holes therein, a hub having annular flanges and holes therein, wire spokes having their inner ends inserted into the holes in said hub flanges and clinched to lock said ends in the hub flanges, the outer ends of said spokes being inserted through the holes in the flange of said rim and tightened in said holes to tension said spokes, the corresponding spokes at opposite ends of the hub being in staggered relation.

2. A method of wheel making which consists in inserting the looped inner ends of wire spokes into holes in a wheel hub flanges, applying pressure to said loops to close them and clinch the spokes on the hub, inserting the looped outer ends of said spokes into holes in the wheel rim and applying a drawing tool to the outer ends of said spokes to tension them between said hub flanges and said rim, the pull of the spokes on said hub being in a rotary direction.

3. A wheel comprising a T-bar rim folded to a circular form, the annular flange of said rim having a series of holes therein, a hub having annular flanges and holes therein, wire spokes having bent ends inserted into the holes in said hub flanges, and clinched therein, the outer ends of said spokes being inserted into the holes in said rim flange and drawn therein to tension said spokes, the ends of the spokes in said hub flanges being oppositely bent from the ends of the spokes in said rim flange, the inner ends of adjoining spokes at the same end of said hub being in crossed relation, one group pulling on said hub in one direction and the other group in substantially an opposite direction.

In witness whereof, I have hereunto set my hand this 31st day of October, 1921.

ARTHUR O. HUBBARD.